United States Patent
Edwards et al.

(10) Patent No.: US 9,683,752 B2
(45) Date of Patent: Jun. 20, 2017

(54) HYBRID FAN ASSEMBLY AND ACTIVE HEATING PUMPING SYSTEM

(71) Applicant: Phononic Devices, Inc., Durham, NC (US)

(72) Inventors: Jesse W. Edwards, Wake Forest, NC (US); Robert Joseph Therrien, Cary, NC (US); Mattias K-O Olsson, Durham, NC (US); Robert B. Allen, Laurens, SC (US); Abhishek Yadav, Cary, NC (US); Paul Brian McCain, Chapel Hill, NC (US); Ricardo E. Rodriguez, Raleigh, NC (US); Justin W. English, Apex, NC (US); Daniel Barus, Raleigh, NC (US); Marshall Stanley, Chapel Hill, NC (US)

(73) Assignee: Phononic Devices, Inc., Durham, NC (US)

( * ) Notice: Subject to any disclaimer, the term of this patent is extended or adjusted under 35 U.S.C. 154(b) by 0 days.

(21) Appl. No.: 15/298,357

(22) Filed: Oct. 20, 2016

(65) Prior Publication Data
US 2017/0038084 A1  Feb. 9, 2017

Related U.S. Application Data (63) Continuation of application No. 14/734,119, filed on Jun. 9, 2015, now abandoned.
(Continued)

(51) Int. Cl.
*F24F 5/00* (2006.01)
*F25B 30/02* (2006.01)
(Continued)

(52) U.S. Cl.
CPC ............ *F24F 5/0096* (2013.01); *F04D 17/16* (2013.01); *F04D 25/088* (2013.01); *F04D 29/30* (2013.01);
(Continued)

(58) Field of Classification Search
CPC ........ F24F 5/0096; F24F 5/0042; F24F 5/001; F24F 5/0021; F24F 7/007; F24F 2221/54;
(Continued)

(56) References Cited

U.S. PATENT DOCUMENTS

| 5,388,958 A | 2/1995 | Dinh | |
| 5,524,450 A * | 6/1996 | Chen | ..................... F24F 1/0003 165/53 |

(Continued)

FOREIGN PATENT DOCUMENTS

| DE | 102004051895 A1 | 4/2006 |
| WO | 2014070628 A1 | 5/2014 |

OTHER PUBLICATIONS

Author Unknown, "Vortex Airflow: What makes our Ceiling Fan Different?" Product Information, Exhale Fans—Bringing Innovation to Ceiling Fans, https://exhalefans.com/innovation.php, accessed May 28, 2015, Exhale Fans LLC, 3 pages.
(Continued)

*Primary Examiner* — Emmanuel Duke
(74) *Attorney, Agent, or Firm* — Withrow & Terranova, PLLC (57) ABSTRACT

Embodiments of a hybrid fan and active heat pumping system are disclosed. In some embodiments, the hybrid fan and active heat pumping system comprises a fan assembly and an active heat pumping system comprises a heat pump. The active heat pumping system is integrated with the fan assembly and is operable to actively cool or heat air as the air passes through the fan assembly. In some embodiments,
(Continued)

the heat pump comprised in the active heat pumping system is a solid-state heat pump, a vapor compression heat pump, or a Stirling Cycle heat pump.

27 Claims, 11 Drawing Sheets

Related U.S. Application Data (60) Provisional application No. 62/009,499, filed on Jun. 9, 2014.

(51) Int. Cl.
| | | |
|---|---|---|
| *F04D 25/08* | (2006.01) | |
| *F24F 7/007* | (2006.01) | |
| *F04D 29/38* | (2006.01) | |
| *F04D 29/58* | (2006.01) | |
| *F28F 13/12* | (2006.01) | |
| *F28D 15/02* | (2006.01) | |
| *F04D 17/16* | (2006.01) | |
| *F04D 29/30* | (2006.01) | |
| *F25B 21/02* | (2006.01) | |
| *F25B 23/00* | (2006.01) | |

(52) U.S. Cl.
CPC ........... *F04D 29/38* (2013.01); *F04D 29/584* (2013.01); *F04D 29/5826* (2013.01); *F24F 5/001* (2013.01); *F24F 5/0021* (2013.01); *F24F 5/0042* (2013.01); *F24F 7/007* (2013.01); *F25B 30/02* (2013.01); *F28D 15/0208* (2013.01); *F28D 15/0266* (2013.01); *F28D 15/0275* (2013.01); *F28F 13/125* (2013.01); *F24F 2221/54* (2013.01); *F25B 21/02* (2013.01); *F25B 23/006* (2013.01)

(58) Field of Classification Search
CPC ...... F04D 29/30; F04D 29/5826; F04D 17/16; F04D 29/38; F04D 29/584; F04D 25/088; F28D 15/0208; F28F 13/125; F25B 30/02; F25B 23/006

See application file for complete search history.

(56) References Cited

U.S. PATENT DOCUMENTS

| 6,120,247 | A | 9/2000 | Wheeler | |
|---|---|---|---|---|
| 6,587,642 | B1* | 7/2003 | King | F04D 25/088 |
| | | | | 392/364 |
| 7,422,163 | B1* | 9/2008 | DeVorss | F04D 25/088 |
| | | | | 239/209 |
| 8,216,871 | B2 | 7/2012 | McCann | |
| 9,360,020 | B2* | 6/2016 | Janecek | F04D 25/082 |
| 2003/0228142 | A1 | 12/2003 | Reiker | |
| 2014/0119924 | A1* | 5/2014 | Hiner | F04D 17/161 |
| | | | | 416/198 R |
| 2014/0260330 | A1* | 9/2014 | Karlstedt | F25B 21/02 |
| | | | | 62/3.3 |
| 2015/0354869 | A1 | 12/2015 | Edwards et al. | |

OTHER PUBLICATIONS

International Search Report and Written Opinion for International Patent Application No. PCT/US2015/034800, mailed Sep. 15, 2015, 9 pages.
Written Opinion for International Patent Application No. PCT/US2015/034800, mailed May 27, 2016, 6 pages.
International Preliminary Report on Patentability for International Patent Application No. PCT/US2015/034800, mailed Sep. 14, 2016, 7 pages.
Non-Final Office Action for U.S. Appl. No. 14/734,119, mailed Feb. 1, 2016, 9 pages.
Final Office Action for U.S. Appl. No. 14/734,119, mailed Jun. 21, 2016, 10 pages.
Advisory Action for U.S. Appl. No. 14/734,119, mailed Sep. 19, 2016, 3 pages.

* cited by examiner

HYBRID FAN ASSEMBLY AND ACTIVE HEATING PUMPING SYSTEM

RELATED APPLICATIONS

This application in a continuation of U.S. patent application Ser. No. 14/734,119, filed Jun. 9, 2015, which claims the benefit of provisional patent application Ser. No. 62/009,499, filed Jun. 9, 2014, the disclosures of which are hereby incorporated herein by reference in their entirety.

FIELD OF THE DISCLOSURE

The present disclosure generally relates to fans (e.g., ceiling fans or standing fans) and more particularly relates to a hybrid fan assembly and active cooling or heating system.

BACKGROUND

Traditional systems used to pump heat to and from a room to reduce or increase air temperature have several shortcomings. In particular, they become inefficient at smaller capacities, they generate an uncomfortable level of noise in occupied spaces from the mechanical components, they can be cumbersome and even dangerous to install, they often require dedicated electrical power outlets to manage surge loads, and they often use toxic and environmentally harmful refrigerants to provide heat pumping.

A common alternative to these traditional systems is to simply use a basic fan (e.g., a ceiling fan or a standing fan). A typical fan can provide an apparent and virtually silent improvement in comfort level derived from either the enhancement of the body's natural cooling system or increase in the delivery rate of warmed air to a user of the fan. This effect is provided simply by the localized increase in the mass flow of air, not by any reduction or increase in air temperature. In humid climates this effect is greatly reduced and the apparent relief is largely eliminated because the air cannot easily absorb any additional water vapor. In hot humid environments, when trying to provide a cooling effect, a fan, at best, simply stirs the hot, moist air around, ensuring uniform discomfort. At worst, the mechanical and electrical work done by a fan will actually warm the air being moved, thereby reversing the desired effectiveness of the appliance in providing cooling relief to the user. In cold, dry environments, additional air flow from a fan without a true increase in air temperature can actually cause the user to feel colder and less comfortable by the same mechanism that provides the cooling effect in warmer conditions.

In light of the discussion above, there remains a need for systems and methods for cooling or heating an occupied space (e.g., a room, an outdoor patio, etc.) that address at least some of the aforementioned problems associated with traditional systems for pumping heat and traditional fans.

SUMMARY

Embodiments of a hybrid fan and active heat pumping system are disclosed. In some embodiments, a hybrid fan and active heat pumping system comprising a fan assembly and an active heat pumping system comprising a heat pump are provided. The active heat pumping system is integrated with the fan assembly and is operable to actively cool or heat air as the air passes through the fan assembly. In some embodiments, the heat pump comprised in the active heat pumping system is a solid-state heat pump, a vapor compression heat pump, or a Stirling Cycle heat pump.

In some embodiments, the fan assembly comprises a moving blade assembly, and the active heat pumping system comprises a static heat exchanger array that is thermally coupled to the moving blade assembly of the fan assembly. The static heat exchanger array is actively cooled or heated by the active heat pumping system.

In some embodiments, the fan assembly comprises a moving blade assembly comprising multiple fan blades, and the active heat pumping system is configured to directly cool or heat the plurality of fan blades. In some embodiments, the fan assembly comprises a moving blade assembly comprising multiple fan blades, and the active heat pumping system is configured to directly cool or heat at least one of the plurality of fan blades.

In some embodiments, the active heat pumping system is a cooling system that actively cools the air as the air passes through the fan assembly, and the heat of work and heat pumped by the heat pump comprised in the active heat pumping system is managed by one or more techniques. These one or more techniques include directing the heat of work and heat pumped by the heat pump to and storing the heat of work and heat pumped by the heat pump in a phase change material, directing the heat of work and heat pumped by the heat pump away from an immediate vicinity of users of the fan assembly in an occupied space cooled by the hybrid fan and active heat pumping system by a pumped fluid loop, directing the heat of work and heat pumped by the heat pump away from an immediate vicinity of users in an occupied space cooled by the hybrid fan and active heat pumping system by a forced convection system, and/or directing the heat of work and heat pumped by the heat pump away from an immediate vicinity of users in an occupied space cooled by the hybrid fan and active heat pumping system and allowed to pool naturally in upper levels of the occupied space.

In some embodiments, the active heat pumping system is a cooling system that actively cools the air as the air passes through the fan assembly, and the heat of work of the heat pump comprised in the active heat pumping system is removed from an occupied space cooled by the hybrid fan and active heat pumping system to an isolated and external heat sink or condensing assembly.

In some embodiments, the fan assembly comprises multiple blades. Further, in some embodiments, the fan assembly further comprises a housing, wherein the heat pump is comprised in the housing.

In some embodiments, the active heat pumping system is a cooling system that further comprises a cold side heat exchange assembly that is operable to transfer heat from at least one of the blades of the fan assembly to a cold side of the heat pump such that the at least one of the blades is actively cooled by the heat pump. In some embodiments, the cold side heat exchange assembly comprises a thermosiphon assembly that is integrated with the at least one blade.

In some embodiments, the fan assembly is a ceiling fan assembly operable to blow the air cooled by the active heat pumping system downward into an occupied space, and the active heat pumping system further comprises a hot side heat exchange assembly that is operable to reject heat of work and heat pumped by the heat pump to an upper area of the occupied space.

In some embodiments, the fan assembly is a ceiling fan assembly operable to blow the air cooled by the active heat pumping system downward into an occupied space of a residential or commercial structure, and the active heat pumping system further comprises a hot side heat exchange assembly that is operable to reject heat of work and heat pumped by the heat pump to an unoccupied space of the residential or commercial structure.

In some embodiments, the fan assembly is a ceiling fan assembly operable to blow the air cooled by the active heat pumping system downward into an occupied space of a residential or commercial structure, and the active heat pumping system further comprises a hot side heat exchange assembly that is operable to reject heat of work and heat pumped by the heat pump to an area external to the residential or commercial structure via an external reject assembly. Further, in some embodiments, the hot side heat exchange assembly further comprises a heat transport mechanism operable to transport heat from a hot side of the heat pump to the external reject assembly.

In some embodiments, the fan assembly is a standing fan assembly. Further, in some embodiments, the active heat pumping system further comprises a hot side heat exchange assembly that is operable to reject heat of work and heat pumped by the heat pump to a remote reject assembly.

In some embodiments, the active heat pumping system is a cooling system, and the active heat pumping system comprises a stator that is actively cooled by the heat pump. The stator is operable to cool the air as the air passes through the fan assembly.

In some embodiments, the fan assembly is an impeller-based ceiling fan assembly comprising multiple rotating discs that operate as horizontal impellers that draw air from a lower region of an occupied space cooled or heated by the hybrid fan and active heat pumping system into a central region of the rotating discs and then propels the air radially outward from the rotating discs. The active heat pumping system is operable to cool or heat the air as the air is drawn into the central region of the rotating discs from the lower region of the occupied space. In some embodiments, outer edges of the rotating discs are structured to direct the air that is propelled radially outward from the rotating discs at a downward angle.

In some embodiments, the active heat pumping system further comprises a hot side heat exchange assembly that is operable to reject heat of work and heat pumped by the heat pump to an upper area of the occupied space. In other embodiments, the occupied space is in a residential or commercial structure, and the active heat pumping system further comprises a hot side heat exchange assembly that is operable to reject heat of work and heat pumped by the heat pump to an unoccupied space of the residential or commercial structure. In other embodiments, the occupied space is in a residential or commercial structure, and the active heat pumping system further comprises a hot side heat exchange assembly that is operable to reject heat of work and heat pumped by the heat pump to an area external to the residential or commercial structure via an external reject assembly.

In some embodiments, the fan assembly is a centrifugal fan assembly comprising multiple vertical impellers, an air inlet, and an air outlet. The vertical impellers are operable to rotate around an air inlet to draw the air into the air inlet and blow the air out of the air outlet. The centrifugal fan assembly is configured as a ceiling fan such that the centrifugal fan assembly is operable to draw air from a lower region of an occupied space cooled or heated by the hybrid fan and active heat pumping system into the air inlet and blow the air out of the air outlet. The active heat pumping system is operable to cool or heat the air as the air is drawn into the air inlet of the centrifugal fan assembly from the lower region of the occupied space.

In some embodiments, the active heat pumping system further comprises a hot side heat exchange assembly that is operable to reject heat of work and heat pumped by the heat pump to an upper area of the occupied space. In other embodiments, the occupied space is in a residential or commercial structure, and the active heat pumping system further comprises a hot side heat exchange assembly that is operable to reject heat of work and heat pumped by the heat pump to an unoccupied space of the residential or commercial structure. In other embodiments, the occupied space is in a residential or commercial structure, and the active heat pumping system further comprises a hot side heat exchange assembly that is operable to reject heat of work and heat pumped by the heat pump to an area external to the residential or commercial structure via an external reject assembly.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The natural cooling effect provided by moving air can significantly improve the apparent comfort level of a user of a fan in some conditions. Further cooling, or warming in colder conditions, the real temperature of the flowing air, by even a small margin, can realize significant gains in comfort level. As such, the real and apparent comfort level felt by the user of the fan can be greatly enhanced, in all conditions, by the addition of a heat pumping system to provide actively heated or sub-cooled air to the occupied environment. Some embodiments of the present disclosure utilize active heat pumping (e.g., solid state, vapor compression, Stirling Cycle heat pump or similar) to provide heating or cooling for either a static heat exchanger array that is thermally coupled to a moving blade assembly of a fan (by some heat transport fluid such as a traditional refrigerant, air, water, etc.) or direct heating or cooling of the moving fan blades themselves to generate heated or sub-cooled air that is then delivered to the user by the fan assembly. In some embodiments, the heat of work from the active heat pumping system and the heat pumped from the occupied space is managed by one or more combinations of:

Directed to and stored in a Phase Change Material (PCM),
Directed away from the user's immediate vicinity by a pumped fluid loop and/or forced convection system, or
Allowed to pool naturally in the upper levels of the occupied space, taking advantage of natural air exchange between the occupied space and the external environment through existing ventilation paths.

In other embodiments, the heat of work generated by the active heat pumping system is removed from the occupied space completely, e.g., to an isolated and external sink or reject/condensing assembly by one or some combination of, but not limited to, the following: a forced convection system, a pumped single phase fluid loop, a conductive plate, a passive/active two phase transport system, or some other heat transport system.

Before continuing the description of embodiments of the present disclosure, it is beneficial to define some terms, as follows:

Fan Assembly: As used herein, a "fan assembly" refers to any device for producing a current of air. In some embodiments, a fan assembly is any of various devices consisting essentially of a series of radiating vanes or blades attached to and revolving with a central hub-like portion to produce a current of air (e.g., a ceiling fan, a wall fan, a standing fan, a centrifugal fan (i.e., a squirrel cage fan), or the like). In other embodiments, a fan assembly is a bladeless fan assembly (e.g., a bladeless fan assembly that produces a current of air via impeller technology).

Hybrid Fan and Active Heat Pumping System: As used herein, a "hybrid fan and active heat pumping system" is a system that integrates a fan assembly and an active heat pumping system.

Active Heat Pumping System: As used herein, an "active heat pumping system" is any system that utilizes a heat pump to actively pump heat. The active heat pumping system can be a cooling system that utilizes a heat pump to actively cool or a heating system that utilizes a heat pump to actively heat.

Cooling System: As used herein, a "cooling system" is any active heat pumping system that utilizes a heat pump for cooling. A cooling system includes a heat pump, a cold side heat exchange assembly (e.g., a thermosiphon assembly), and a hot side heat exchange assembly (e.g., a heat sink). The heat pump operates to cool that which is in thermal contact with the cold side exchange assembly and to reject, or remove, the heat of work and heat pumped by the heat pump via the hot side heat exchange assembly.

Heating System: As used herein, a "heating system" is any active heat pumping system that utilizes a heat pump for heating.

Heat Pump: As used herein, a "heat pump" is any system or device that actively moves heat from one location (the "source") at a lower temperature to another location (the "sink") at a higher temperature. Some examples of a heat pump are a solid-state heat pump, a vapor compression heat pump, and a Stirling Cycle heat pump. While not being limited thereto, in some embodiments, a heat pump is a solid-state heat pump including one or more thermoelectric modules, where each thermoelectric module includes multiple thermoelectric devices (see, for example, U.S. Pat. No. 8,216,871, entitled METHOD FOR THIN FILM THERMOELECTRIC MODULE FABRICATION, which is hereby incorporated herein by reference for its teachings of a thermoelectric module).

Figure 1A:
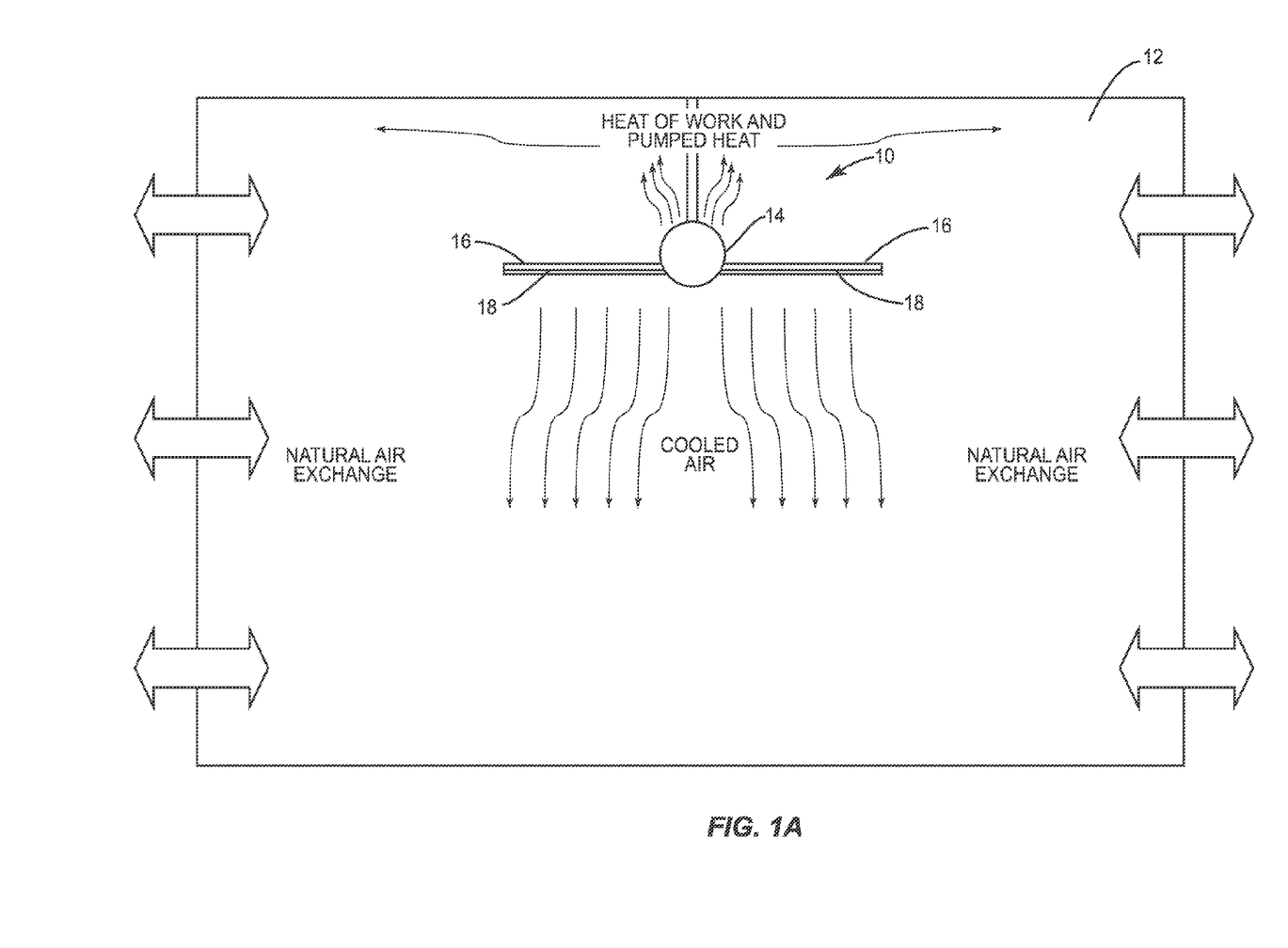
FIGS. 1A through 1C illustrate exemplary embodiments of a hybrid fan and active heat pumping assembly in which blades of a fan assembly are cooled and heat is rejected to upper layers of an occupied space.
Figure 1B:
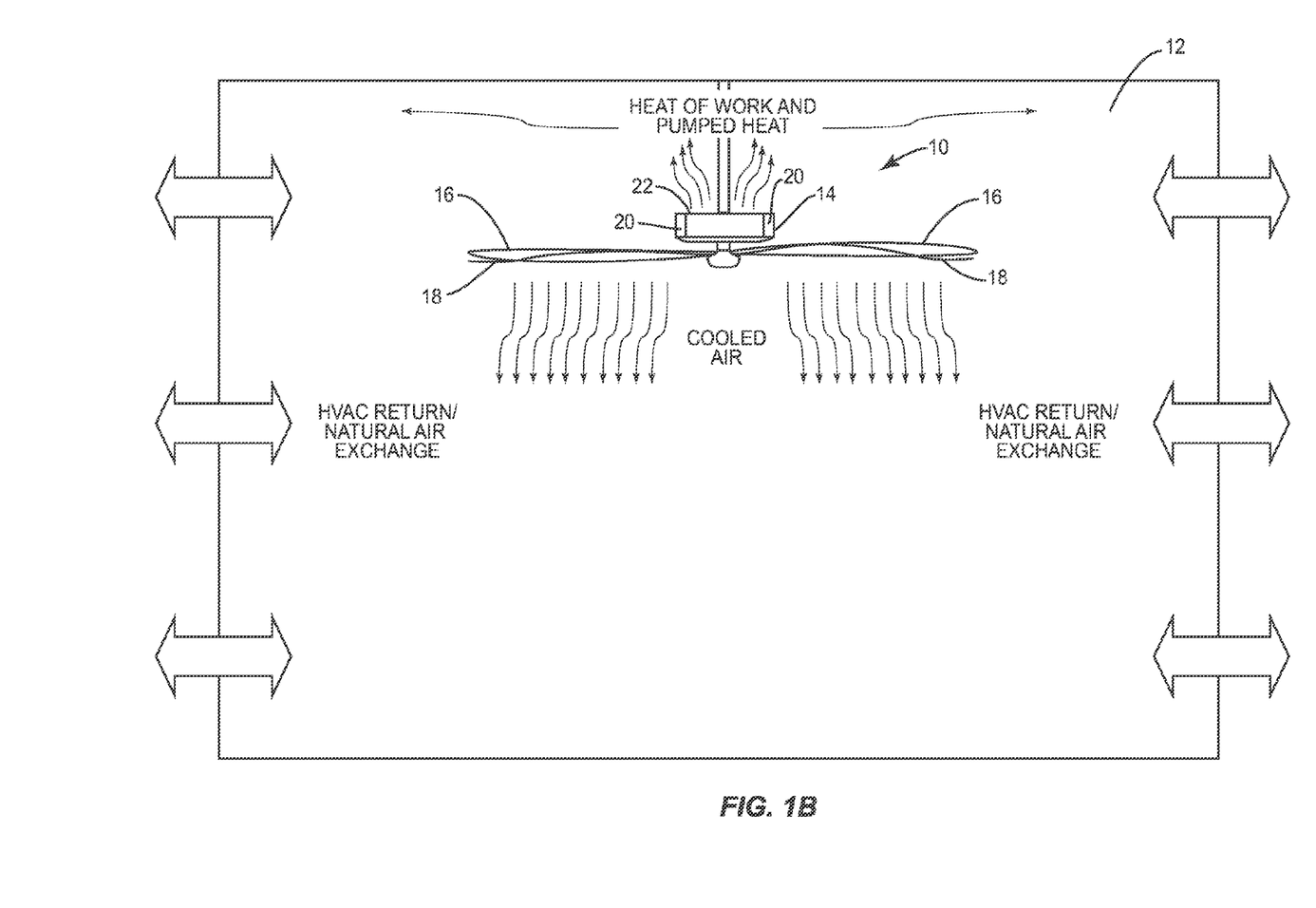
Figure 1C:
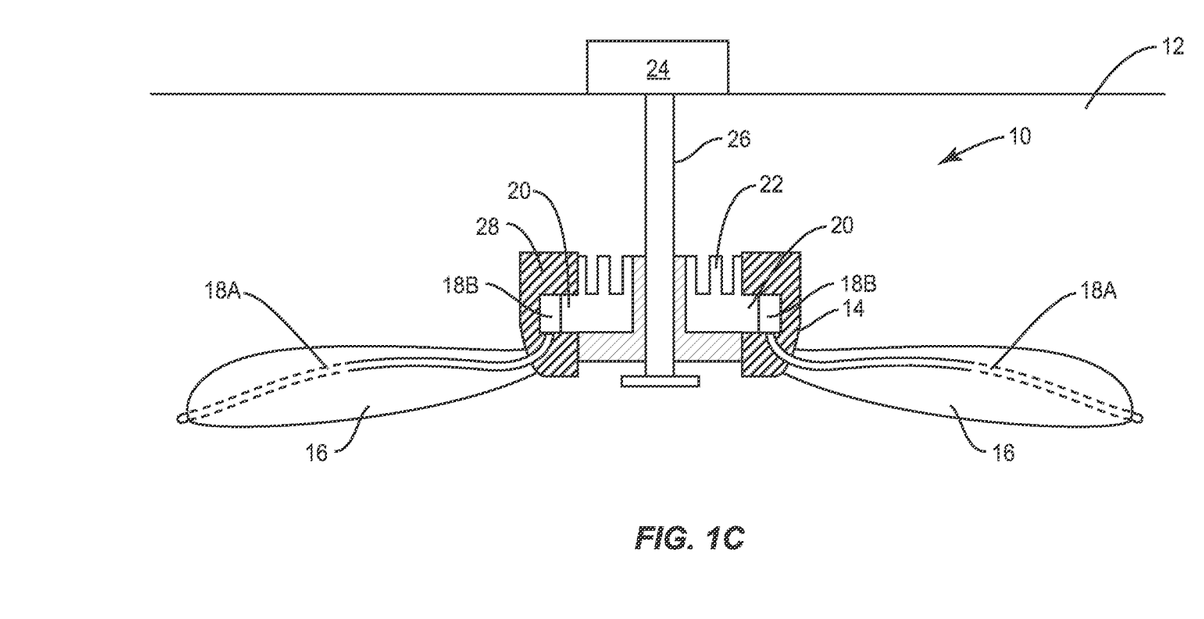

FIGS. 1A through 1C illustrate some examples of a hybrid fan and active heat pumping system 10 according to some embodiments of the present disclosure. In the embodiment of FIG. 1A, the hybrid fan and active heat pumping system 10 includes a fan assembly and a heat pumping system that is integrated with the fan assembly. In this example, the fan assembly is a ceiling fan assembly configured to hang from a ceiling of an occupied space 12 in a residential structure (e.g., a home, an apartment, an outdoor patio, etc.) or a commercial structure (e.g., a restaurant, an office, a warehouse, etc.). The fan assembly includes a housing 14 and a number of blades 16 that rotate around a central axis of the fan assembly. The active heat pumping system includes one or more heat pumps (not shown) within the housing 14 that actively cool one or more (and possibly all) of the blades 16 of the fan assembly via corresponding cold side heat exchange assemblies 18 (e.g., thermosiphons) that is(are) integrated with (i.e., within or attached to) the corresponding blades 16. The active heat pumping system also includes a hot side heat exchange assembly (e.g., a metal heat sink) (not shown) that operates to, in this example, reject the heat of work and heat pumped by the heat pump(s) to upper levels of the occupied space 12.

FIG. 1B is another illustration of the hybrid fan and active heat pumping system 10 of FIG. 1A that illustrates a heat pump(s) 20 and a hot side heat exchange assembly 22 within the housing 14 of the hybrid fan and active heat pumping system 10.

FIG. 1C is a more detailed illustration of one specific implementation of the hybrid fan and active heat pumping system 10 of FIG. 1A. The implementation of FIG. 10 is a non-limiting example. As illustrated, a motor 24 (e.g., a Direct Current (DC) motor) turns a shaft 26 that is connected to the housing 14 to thereby rotate, in this example, both the housing 14 and the blades 16 of the fan assembly. In this example, the heat pump(s) 20 are, e.g., solid-state heat pumps or heat pumps including a Thermoelectric Module(s) (TEM(s)). For each of the blades 16 that is cooled, the cold side heat exchange assembly 18 for that blade 16 is a thermosiphon assembly including a thermosiphon 18A that is integrated with the blade 16 and a heat exchanger 18B, or condenser, that operates to provide heat exchange between evaporated coolant from the thermosiphon 18A and the cold side of the corresponding heat pump 20. As will be appreciated by one of ordinary skill in the art, the thermosiphon 18A provides passive two-phase heat transport between the corresponding blade 16 and the cold side of the corresponding heat pump 20. Notably, while the thermosiphon 18A is used in this example, other heat transport mechanisms may be used for heat exchange between the blades 16 and the cold side of the heat pump(s) 20. In this example, the hot side heat exchange assembly 22 is a heat sink. Further, in this example, insulation 28 is included in the housing 14 to insulate the active heat pumping system from the housing 14.

During operation, the heat pump(s) 20 are active while the fan assembly is turned on. As air passes through the fan assembly, the air is cooled by the (cooled) blades 16 such that cooled air is blown downward into the occupied space 12 by the hybrid fan and active heat pumping system 10. In this example, the heat of work and heat pumped by the heap pump(s) 20 is rejected to the upper levels of the occupied space 12 by the hot side heat exchange assembly 22. This heat is removed from the occupied space 12 via natural air exchange or, e.g., a Heating, Ventilating, and Air Conditioning (HVAC) return of a HVAC system that otherwise cools the occupied space 12.

Figure 2A:
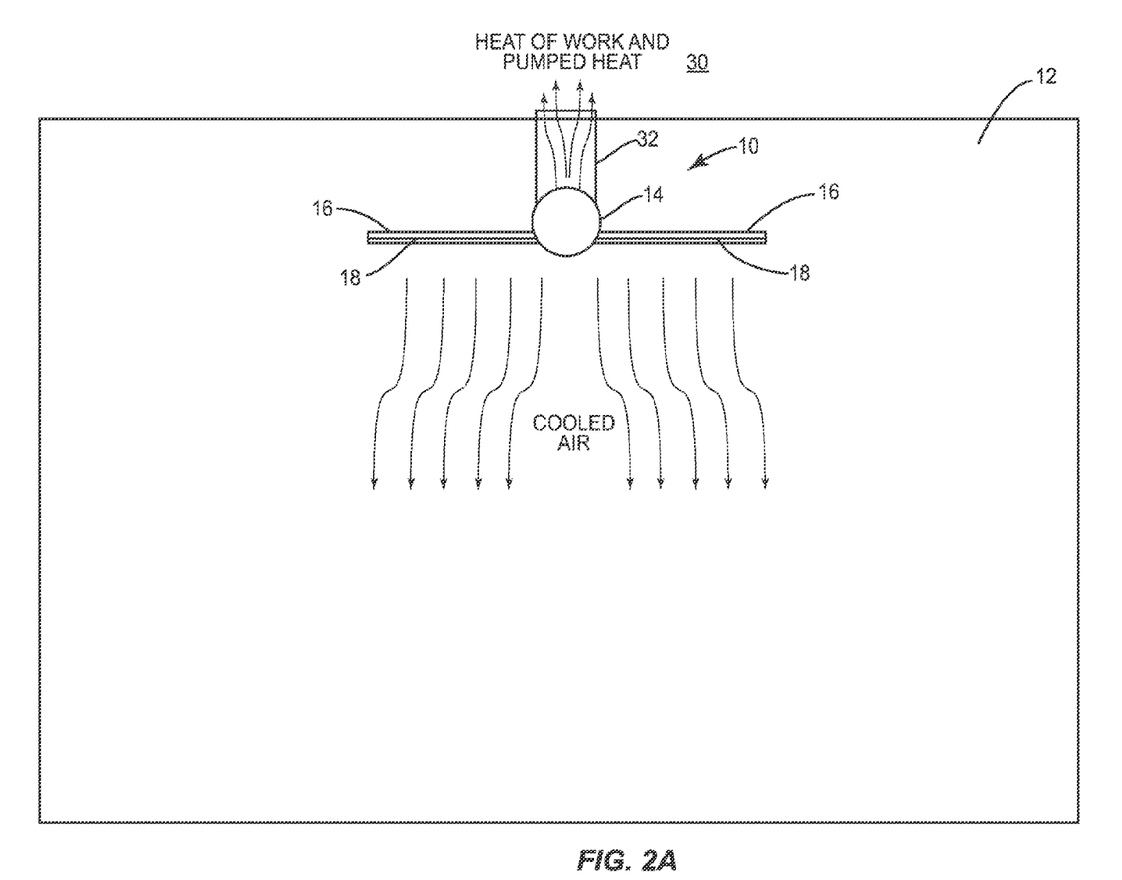
FIGS. 2A and 2B illustrate exemplary embodiments of a hybrid fan and active heat pumping assembly in which blades of the fan assembly are cooled and heat is rejected to an unoccupied space.
Figure 2B:
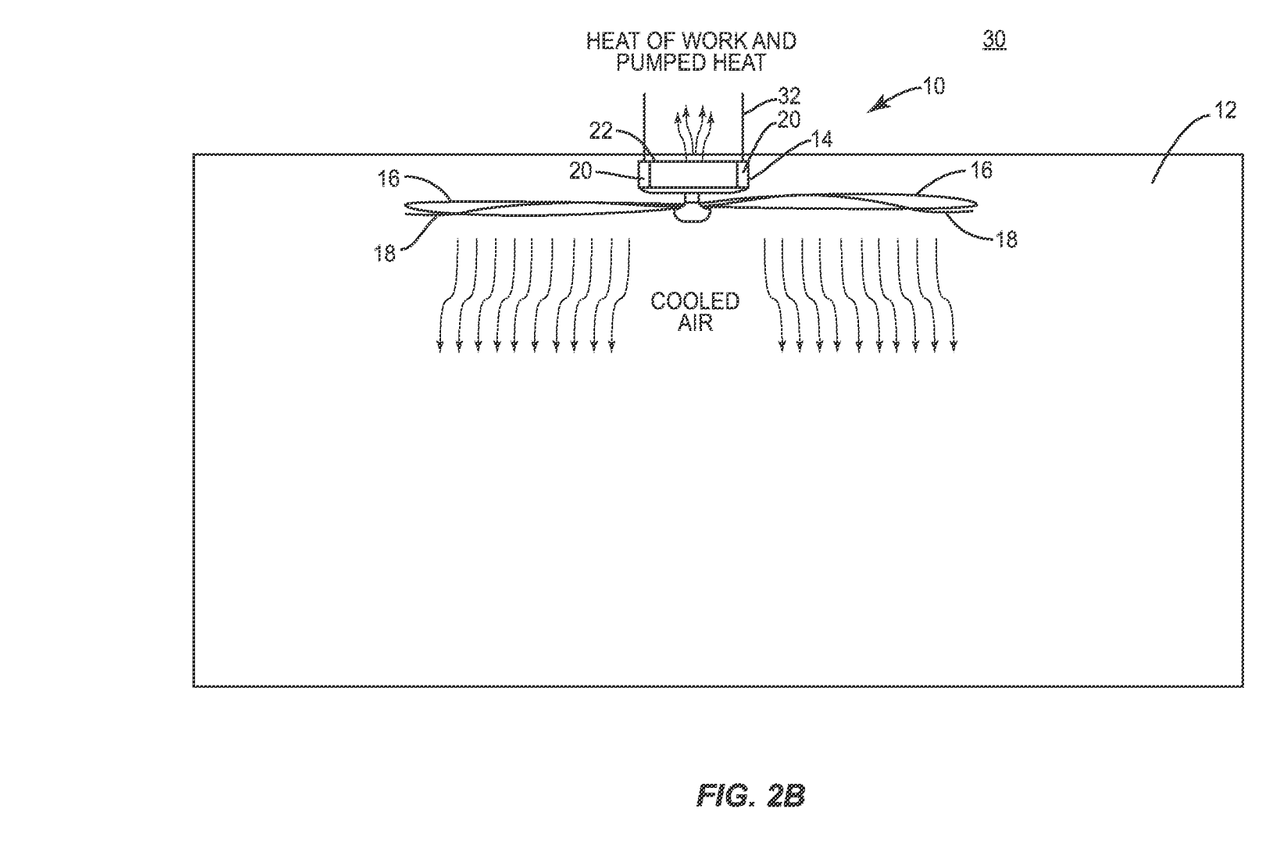

FIGS. 2A and 2B illustrate embodiments of the hybrid fan and active heat pumping system 10 that are similar to that of FIGS. 1A and 1B, respectively, but where the heat of work and pumped heat are rejected to an unoccupied space 30. More specifically, the occupied space 12 is a space within a larger structure, which may be a residential structure or a commercial structure. The unoccupied space 30 is a space within the larger structure that is not occupied by people (e.g., an attic). In this example, the hybrid fan and active heat pumping system 10 includes an air duct 32 that directs the heat rejected by the hot side heat exchange assembly 22 to the unoccupied space 30 above the occupied space 12. Note that the air duct 32 may, in some embodiments, be part of the housing 14 of the hybrid fan and active heat pumping system 10. While not illustrated, in one specific embodiment, the active heat pumping system is as descried above with respect to FIG. 1C.

Figure 3:
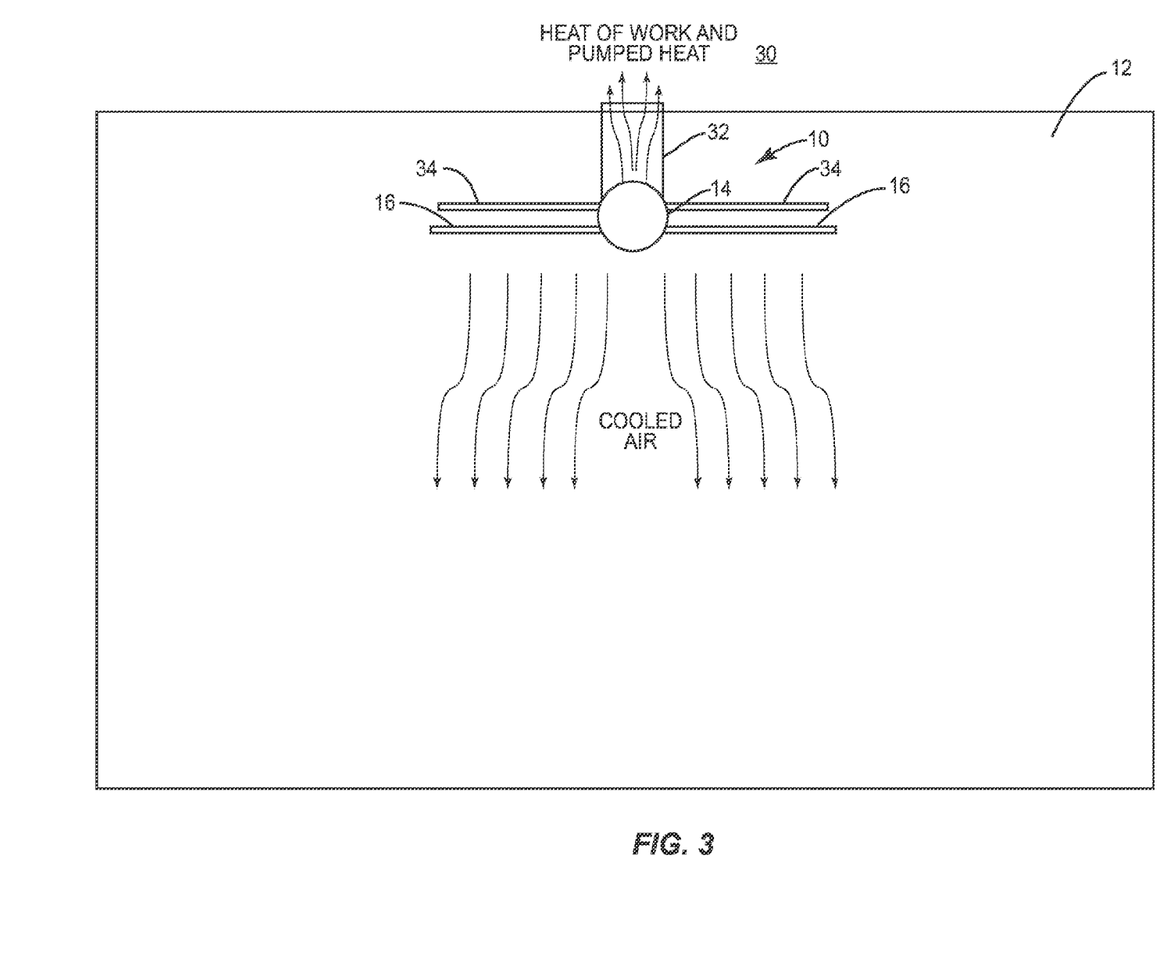
FIG. 3 illustrates an exemplary embodiment of a hybrid fan and active heat pumping assembly in which cooling is provided by one or more stators and heat is rejected to an unoccupied space.

Thus far, the embodiments described with respect to FIGS. 1A through 10 and FIGS. 2A and 2B cool the blades 16 of the fan assembly. However, the present disclosure is not limited thereto. In some embodiments, rather than (or in addition to) cooling the blades 16 of the fan assembly, the active heat pumping system includes a static heat exchanger that cools the air either before or after the air passes through the blades 16 of the fan assembly. In this regard, FIG. 3 illustrates one example of the hybrid fan and active heat pumping system 10 that includes one or more cooled stators 34 according to some embodiments of the present disclosure. In this example, the blades 16 are not cooled directly.

As discussed above, the fan assembly includes the housing 14 and the blades 16 that rotate around the central axis of the fan assembly. The active heat pumping system includes one or more heat pumps (not shown) within the housing 14 that actively cool the stators 34 via corresponding cold side heat exchange assemblies (e.g., thermosiphons) that is(are) integrated with (i.e., within or attached to) the corresponding stators 34. The active heat pumping system also includes a hot side heat exchange assembly (e.g., a metal heat sink) (not shown) that operates to, in this example, reject the heat of work and heat pumped by the heat pump(s) 20 to the unoccupied space 30. Note, however, that in other embodiments, the heat may be rejected to the upper layers of the occupied space 12 in a manner similar to that which is done in the embodiment of FIGS. 1A through 10. In some particular embodiments, the details of the active heat pumping system are otherwise the same as that described above with respect to FIG. 10.

Figure 4A:
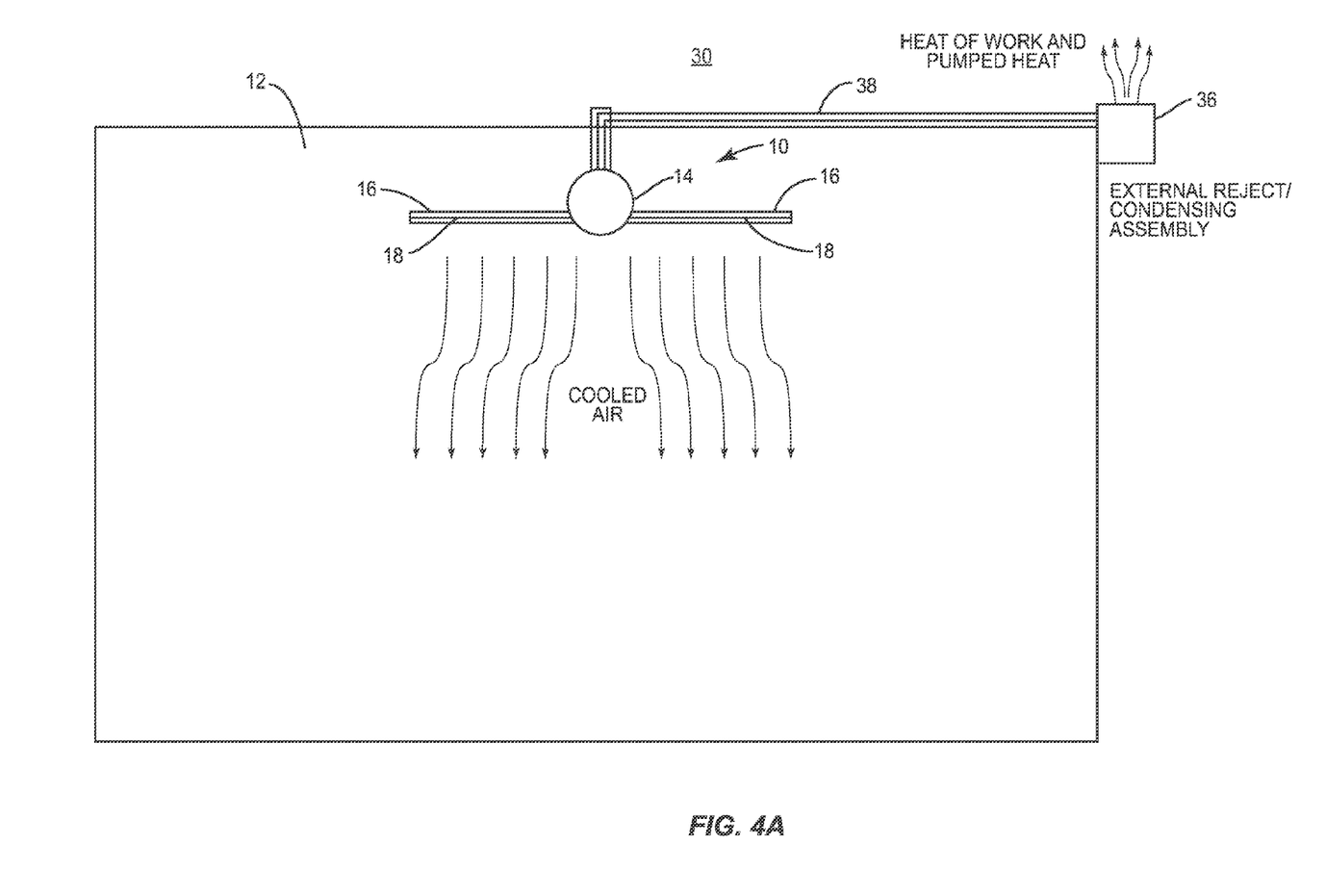
FIGS. 4A and 4B illustrate exemplary embodiments of a hybrid fan and active heat pumping assembly in which blades of the fan assembly are cooled and heat is rejected to an external reject/condensing assembly.
Figure 4B:
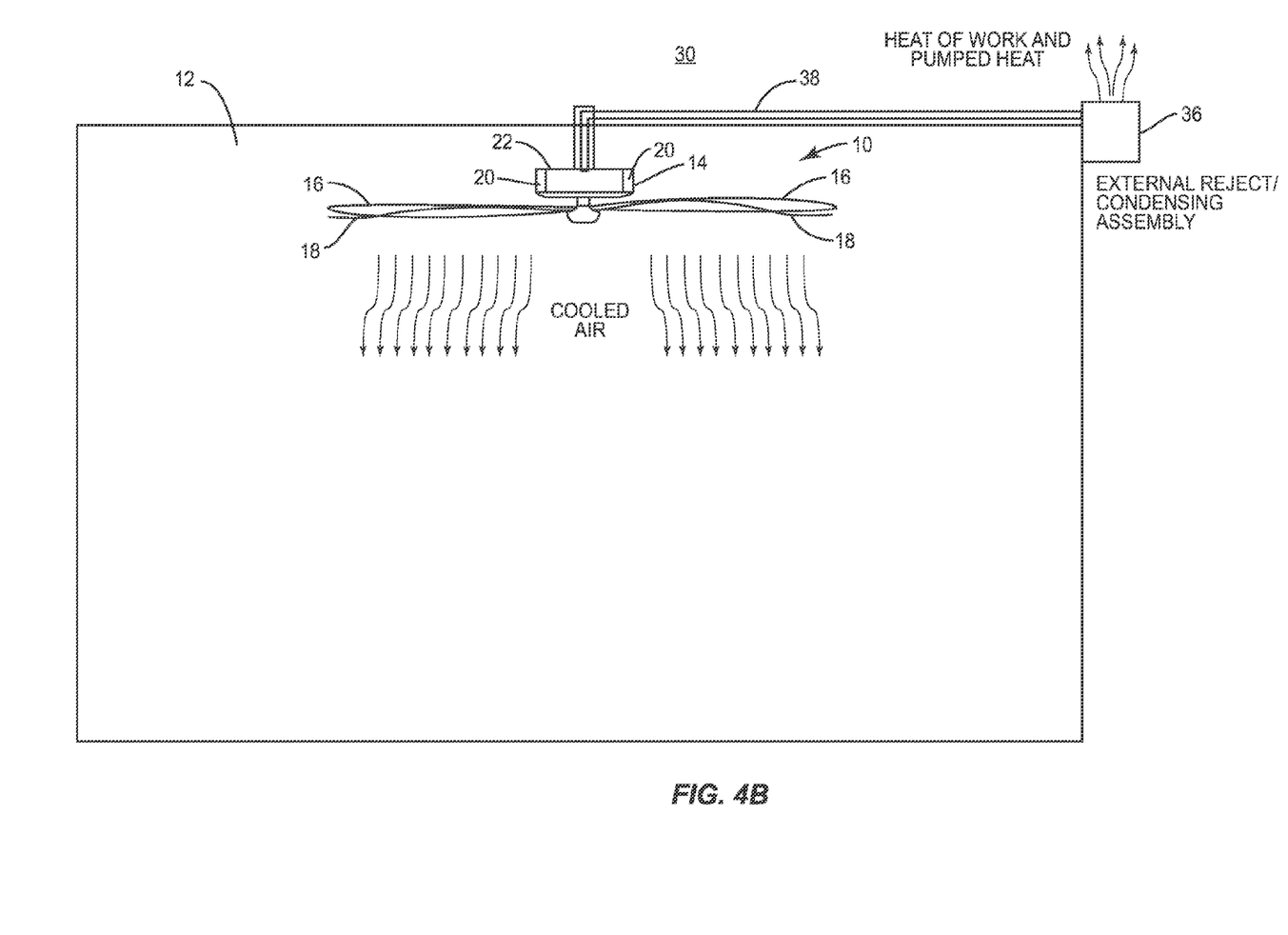

FIGS. 4A and 4B illustrate embodiments similar to that of FIGS. 1A and 1B, respectively, but where the heat is rejected to an external reject/condensing assembly 36. The external reject/condensing assembly 36 is "external" in that it is external to the larger structure (e.g., on the outside of a house or building). As illustrated in FIGS. 4A and 4B, the hot side heat exchange assembly 22 includes a heat transport assembly 38 that transports the rejected heat from the heat pump(s) 20 to the external reject/condensing assembly 36. This heat transport assembly 38 may be any suitable active or passive heat transport assembly. Some examples of the heat transport assembly 38 are a thermosiphon assembly that provides passive two-phase heat transport and a pumped fluid loop.

Figure 5:
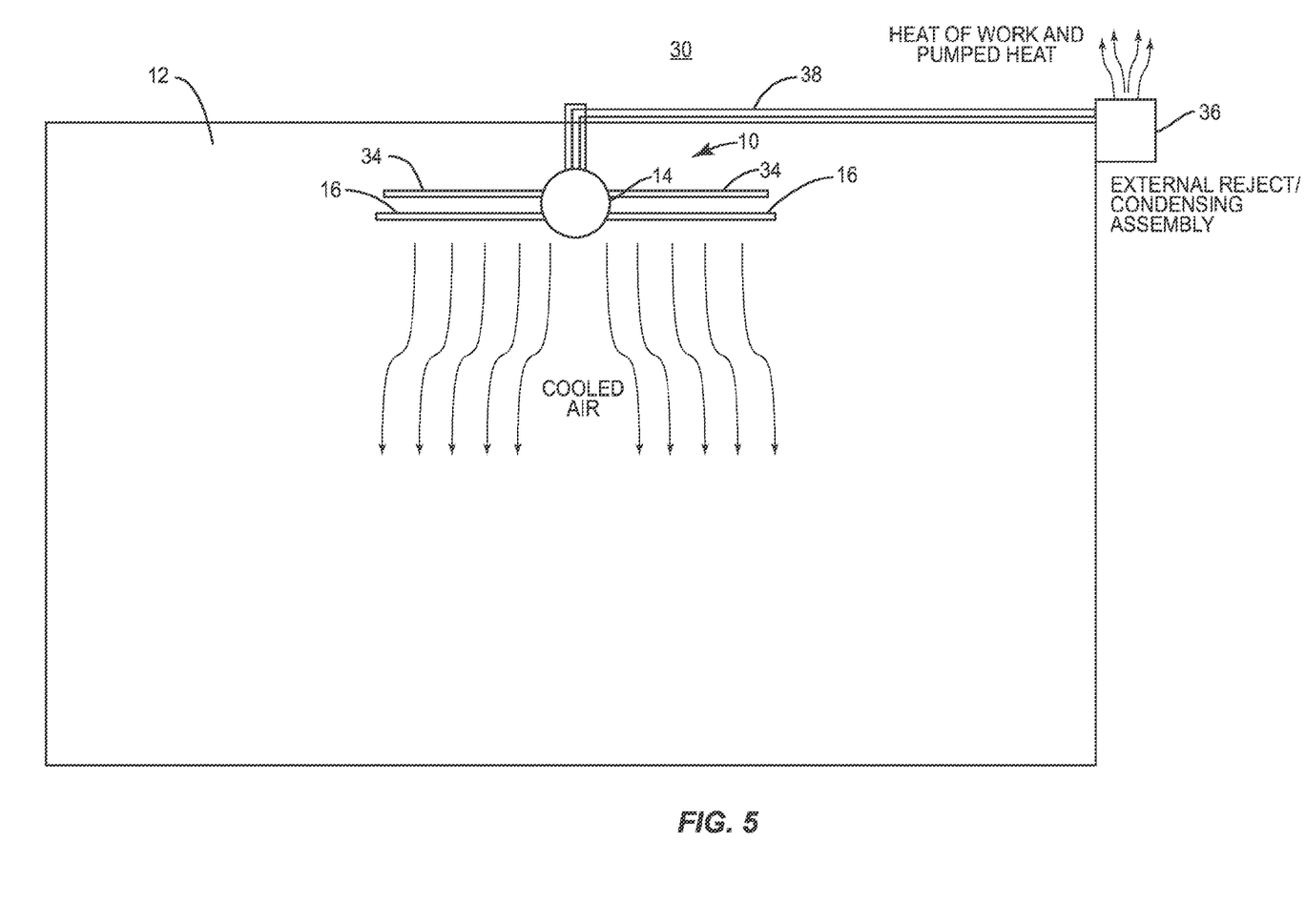
FIG. 5 illustrates an exemplary embodiment of a hybrid fan and active heat pumping assembly in which cooling is provided by one or more stators and heat is rejected to an external reject/condensing assembly.

FIG. 5 illustrates an embodiment of the hybrid fan and active heat pumping system 10 that is similar to that of FIG. 3 but where heat is rejected to the external reject/condensing assembly 36 as described above with respect to FIGS. 4A and 4B.

Figure 6:
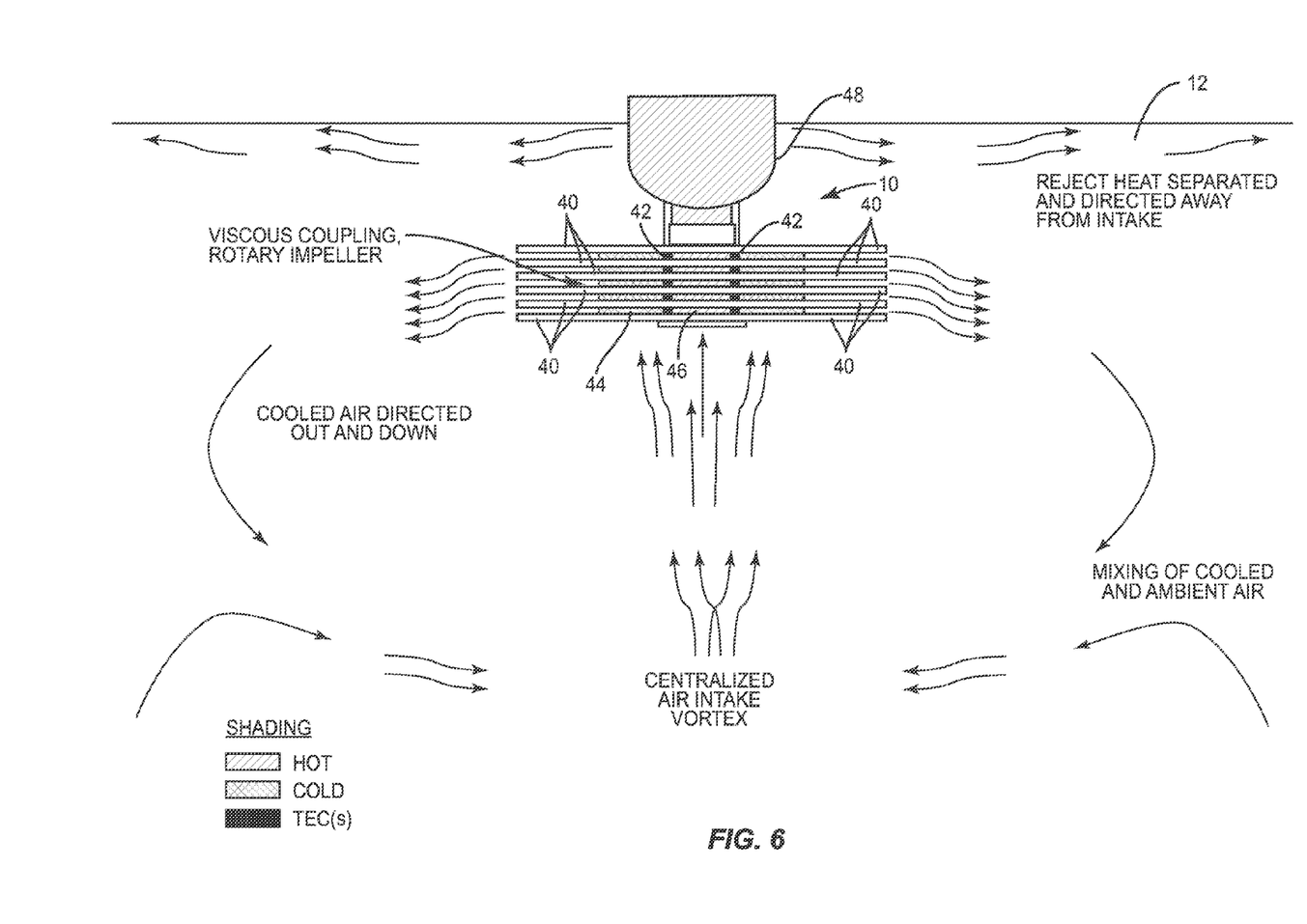
FIG. 6 illustrates an exemplary embodiment of a hybrid fan and active heat pumping assembly in which the fan assembly is an impeller based fan assembly.

Thus far, the description has focused on embodiments in which the fan assembly is a rotary ceiling fan including multiple blades 16. However, the present disclosure is not limited thereto. Any suitable fan assembly may be used. In this regard, FIG. 6 illustrates the hybrid fan and active heat pumping system 10 according to some other embodiments of the present disclosure in which the fan assembly is a horizontal impeller based ceiling fan. This fan assembly is a bladeless fan assembly that operates based on impeller technology. As illustrated, the fan assembly includes multiple discs 40. Each disc 40, other than possibly the uppermost disc 40, is an annulus or ring (i.e., the center area of the disc 40 is hollow). The hollow center areas of the discs 40 define an air inlet of the fan assembly. During operation, a motor rotates the discs 40. The as discs 40 rotate, air is drawn upward from the occupied space 12 into the center areas of the discs 40 (i.e., into the air inlet of the fan assembly). This air is then propelled radially outward from the discs 40 through spaces between the discs 40. While not essential, for more information regarding a horizontal impeller-based fan assembly, the interested reader is directed to International Patent Application Publication No. WO 2014/070628 A1 entitled LAMINAR FLOW RADIO CEILING FAN, which discloses embodiments of an example horizontal impeller-based fan assembly and is hereby incorporated herein by reference for its teachings on horizontal impeller-based fan assemblies.

In FIG. 6, the active heat pumping system is integrated with the fan assembly. In particular, the active heat pumping system includes a heat pump(s) 42, a cold side heat exchange assembly 44, and a hot side heat exchange assembly 46. In this example, the heat pump(s) 42, the cold side heat exchange assembly 44, and the hot side heat exchange assembly 46 are stationary (i.e., do not rotate), whereas the discs 40 do rotate. The heat pump(s) 42 operate to cool the air drawn from the occupied space 12 into the center area of the discs 40 (i.e., the air inlet of the fan assembly) via the cold side heat exchange assembly 44. The cold side heat exchange assembly 44 may include, for example, a heat sink or similar structure that enables air to flow through the air inlet of the fan assembly and radially outward through the spaces between the discs 40 while also providing heat exchange between the air and the cold side of the heat pump(s) 42 as the air is drawn into the air inlet of the fan assembly and propelled radially outward by the rotating discs 40.

The hot side heat exchange assembly 46 operates to, in this example, reject the heat of work and heat pumped by the heat pump(s) 42 to upper levels of the occupied space 12. However, in other embodiments, the heat may be rejected to an unoccupied space or to an external reject/condenser assembly. In one particular example, the hot side heat exchange assembly 46 includes a heat sink within a housing 48 of the hybrid fan and active heat pumping system 10 and a heat transport assembly (not shown) for transporting heat from the hot side(s) of the heat pump(s) 42 to the heat sink.

While not illustrated, the discs 40 may be structured to at least slightly angle the air propelled radially outward from the discs 40 downward into the occupied space 12. For example, the outer edges of the discs 40 may be structured to direct the air downward, at least slightly to encourage the desired air flow pattern. As one specific example, the outer edges of the discs 40 may include vanes that direct the air downward. As another specific example, the outer edges of the discs 40 may be tapered (e.g., the top disc 40 is larger than the next disc 40, which is larger than the next disc 40, and so on) to encourage the downward flow of the air.

Importantly, other types of impeller-based fan assemblies can be used. For example, in other embodiments, the fan assembly in FIG. 6 can be replaced with a vertical impeller or centrifugal fan assembly (also known as a squirrel cage fan) configured, or arranged, such that air from the lower levels of the occupied space 12 is drawn up into the air inlet of the centrifugal fan assembly where the air is cooled by the integrated active heat pumping system. The centrifugal fan assembly then blows the cooled air horizontally out of an air outlet of the centrifugal fan assembly.

Figure 7:
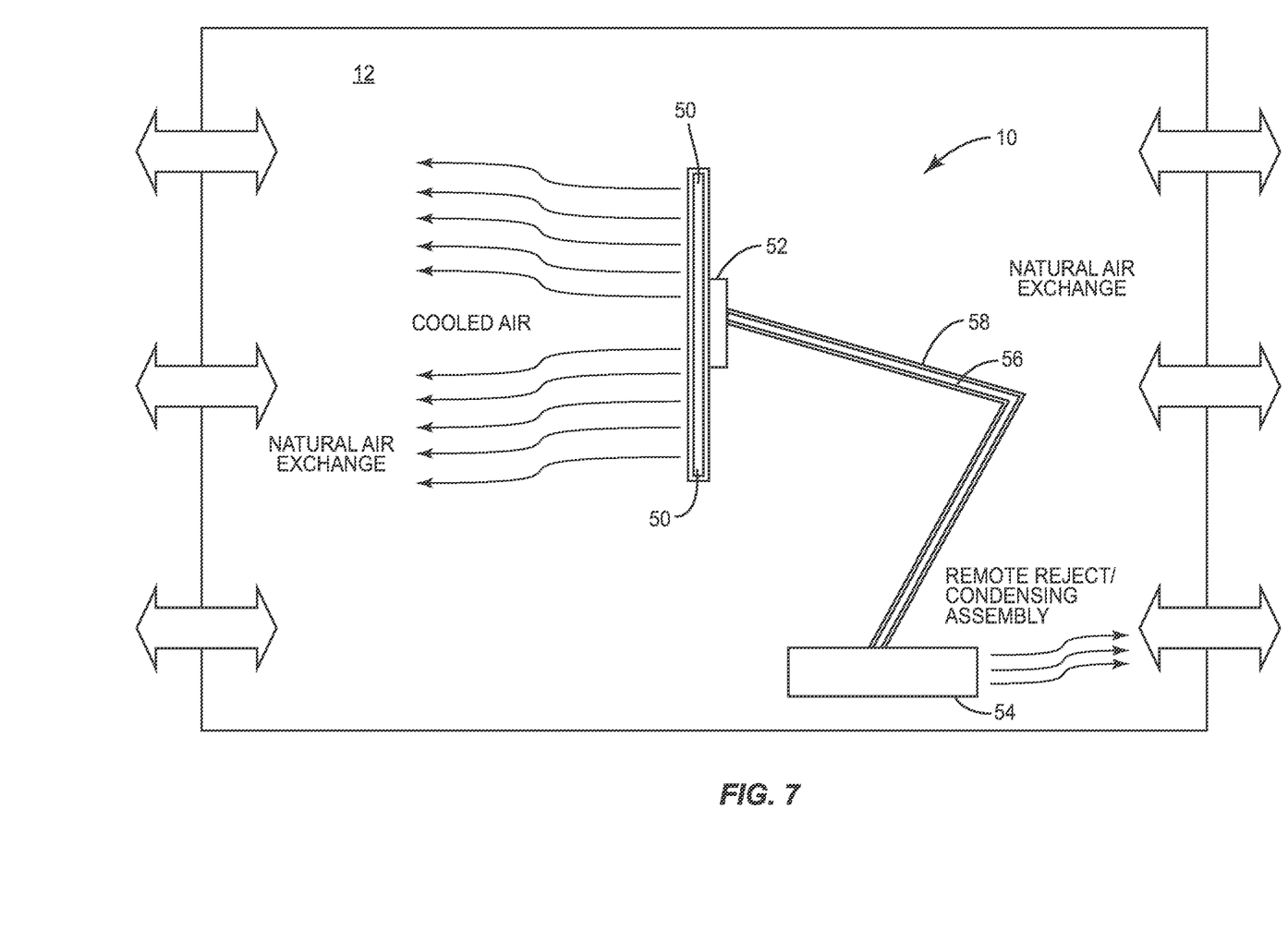
FIG. 7 illustrates an exemplary embodiment of a hybrid fan and active heat pumping assembly in which the fan assembly is a standing fan assembly.

In the embodiments of FIGS. 1A through 10, FIGS. 2A and 2B, FIG. 3, FIGS. 4A and 4B, FIG. 5, and FIG. 6, the fan assembly of the hybrid fan and active heat pumping system 10 is a ceiling fan assembly. However, the present disclosure is not limited to a ceiling fan assembly. In this regard, FIG. 7 illustrates an embodiment of the hybrid fan and active heat pumping system 10 in which the fan assembly is a standing fan assembly. The standing fan assembly includes multiple blades 50 that are cooled by the active heat pumping system in a manner similar to that described above with respect to FIGS. 1A through 10. In particular, the active heat pumping system includes a heat pump(s) within a housing 52 of the hybrid fan and active heat pumping system 10. The heat pump(s) operate to cool one or more of the blades 50 via corresponding cold side heat exchange assemblies (not shown) that are integrated with the corresponding blades 50. The cold side heat exchange assemblies may include any suitable heat transport/exchange mechanism such as, for example, a pumped fluid loop for exchanging heat between the blades 50 and the cold side of the heat pump(s). In this example, the active heat pumping system includes a hot side heat exchange assembly that rejects the heat of work and heat pumped by the heat pump(s) to a remote reject/condensing assembly 54 via a suitable heat transport assembly 56, which in this example is incorporated into an arm 58 of the standing fan assembly. However, the hot side heat exchange assembly may alternatively reject the heat via, e.g., a local heat sink, which may be located within, e.g., the housing 52.

Notably, while the embodiments of FIGS. 1A though 1C, FIGS. 2A and 2B, FIG. 3, FIGS. 4A and 4B, FIG. 5, FIG. 6, and FIG. 7 are embodiments in which the active heat pumping system is a cooling system, the present disclosure is not limited thereto. In some embodiments, the active heat pumping system is a heating system. For example, the heat pumping systems of FIGS. 1A though 1C, FIGS. 2A and 2B, FIG. 3, FIGS. 4A and 4B, FIG. 5, FIG. 6, and FIG. 7 may alternatively be heating systems that operate to heat air blown by the fan assemblies.

Those skilled in the art will recognize improvements and modifications to the preferred embodiments of the present disclosure. All such improvements and modifications are considered within the scope of the concepts disclosed herein and the claims that follow.

What is claimed is:

1. A hybrid fan and active heat pumping system, comprising:
    a fan assembly; and
    an active heat pumping system comprising:
        a heat pump; and
        a cold side heat exchange assembly comprising a thermosiphon assembly that is operable to transfer heat from the fan assembly to a cold side of the heat pump such that the fan assembly is actively cooled by the heat pump;
        the active heat pumping system being integrated with the fan assembly and being operable to actively cool or heat air as the air passes through the fan assembly and the thermosiphon assembly providing passive two-phase heat transport.

2. The hybrid fan and active heat pumping system of claim 1 wherein the heat pump comprised in the active heat pumping system is one of a group consisting of: a solid-state heat pump, a vapor compression heat pump, and a Stirling Cycle heat pump.

3. The hybrid fan and active heat pumping system of claim 1 wherein the fan assembly comprises a blade assembly, and the active heat pumping system comprises a static heat exchanger array that is thermally coupled to the blade assembly of the fan assembly, the static heat exchanger array being actively cooled by the active heat pumping system.

4. The hybrid fan and active heat pumping system of claim 1:
    wherein the fan assembly comprises a moving blade assembly comprising a plurality of fan blades; and
    the active heat pumping system is configured to directly cool the plurality of fan blades.

5. The hybrid fan and active heat pumping system of claim 1:
    wherein the fan assembly comprises a moving blade assembly comprising a plurality of fan blades; and
    the active heat pumping system is configured to directly cool at least one of the plurality of fan blades.

6. The hybrid fan and active heat pumping system of claim 1 wherein heat of work and heat pumped by the heat pump comprised in the active heat pumping system is managed by one or more techniques from a group consisting of:
    directing the heat of work and heat pumped by the heat pump to and storing the heat of work and heat pumped by the heat pump in a phase change material;
    directing the heat of work and heat pumped by the heat pump away from an immediate vicinity of users in an occupied space cooled by the hybrid fan and active heat pumping system by a pumped fluid loop;
    directing the heat of work and heat pumped by the heat pump away from an immediate vicinity of users in an occupied space cooled by the hybrid fan and active heat pumping system by a forced convection system; and
    directing the heat of work and heat pumped by the heat pump away from an immediate vicinity of users in an occupied space cooled by the hybrid fan and active heat pumping system and allowed to pool naturally in upper levels of the occupied space.

7. The hybrid fan and active heat pumping system of claim 1 wherein heat of work of the heat pump comprised in the active heat pumping system is removed from an occupied space cooled by the hybrid fan and active heat pumping system to an isolated and external heat sink or condensing assembly.

8. The hybrid fan and active heat pumping system of claim 1 wherein the fan assembly comprises a plurality of blades.

9. The hybrid fan and active heat pumping system of claim 8 wherein the fan assembly further comprises a housing, wherein the heat pump is comprised in the housing.

10. The hybrid fan and active heat pumping system of claim 8 wherein the cold side heat exchange assembly that is operable to transfer heat from at least one of the plurality of blades to the cold side of the heat pump such that the at least one of the plurality of blades is actively cooled by the heat pump.

11. The hybrid fan and active heat pumping system of claim 10 wherein the thermosiphon assembly is integrated with the at least one of the plurality of blades.

12. The hybrid fan and active heat pumping system of claim 10 wherein the fan assembly is a ceiling fan assembly operable to blow the air cooled by the active heat pumping system downward into an occupied space, and the active heat pumping system further comprises a hot side heat exchange assembly that is operable to reject heat of work and heat pumped by the heat pump to an upper area of the occupied space.

13. The hybrid fan and active heat pumping system of claim 10 wherein the fan assembly is a ceiling fan assembly operable to blow the air cooled by the active heat pumping system downward into an occupied space of a residential or commercial structure, and the active heat pumping system further comprises a hot side heat exchange assembly that is operable to reject heat of work and heat pumped by the heat pump to an unoccupied space of the residential or commercial structure.

14. The hybrid fan and active heat pumping system of claim 10 wherein the fan assembly is a ceiling fan assembly operable to blow the air cooled by the active heat pumping system downward into an occupied space of a residential or commercial structure, and the active heat pumping system further comprises a hot side heat exchange assembly that is operable to reject heat of work and heat pumped by the heat pump to an area external to the residential or commercial structure via an external reject assembly.

15. The hybrid fan and active heat pumping system of claim 14 wherein the hot side heat exchange assembly further comprises a heat transport mechanism operable to transport heat from a hot side of the heat pump to the external reject assembly.

16. The hybrid fan and active heat pumping system of claim 10 wherein the fan assembly is a standing fan assembly.

17. The hybrid fan and active heat pumping system of claim 16 wherein the active heat pumping system further comprises a hot side heat exchange assembly that is operable to reject heat of work and heat pumped by the heat pump to a remote reject assembly.

18. The hybrid fan and active heat pumping system of claim 8 wherein the active heat pumping system comprises a stator that is actively cooled by the heat pump, the stator being operable to cool the air as the air passes through the fan assembly.

19. The hybrid fan and active heat pumping system of claim 1 wherein:
the fan assembly is an impeller-based ceiling fan assembly comprising a plurality of rotating discs that operate as horizontal impellers that draw air from a lower region of an occupied space cooled by the hybrid fan and active heat pumping system into a central region of the plurality of rotating discs and then propels the air radially outward from the plurality of rotating discs; and
the active heat pumping system is operable to cool the air as the air is drawn into the central region of the plurality of rotating discs from the lower region of the occupied space.

20. The hybrid fan and active heat pumping system of claim 19 wherein outer edges of the plurality of rotating discs are structured to direct the air that is propelled radially outward from the plurality of rotating discs at a downward angle.

21. The hybrid fan and active heat pumping system of claim 19 wherein the active heat pumping system further comprises a hot side heat exchange assembly that is operable to reject heat of work and heat pumped by the heat pump to an upper area of the occupied space.

22. The hybrid fan and active heat pumping system of claim 19 wherein the occupied space is in a residential or commercial structure, and the active heat pumping system further comprises a hot side heat exchange assembly that is operable to reject heat of work and heat pumped by the heat pump to an unoccupied space of the residential or commercial structure.

23. The hybrid fan and active heat pumping system of claim 19 wherein the occupied space is in a residential or commercial structure, and the active heat pumping system further comprises a hot side heat exchange assembly that is operable to reject heat of work and heat pumped by the heat pump to an area external to the residential or commercial structure via an external reject assembly.

24. The hybrid fan and active heat pumping system of claim 1 wherein:
the fan assembly is an centrifugal fan assembly comprising a plurality of vertical impellers, an air inlet, and an air outlet, the plurality of vertical impellers operable to rotate around the air inlet to draw the air into the air inlet and blow the air out of the air outlet, the centrifugal fan assembly being configured as a ceiling fan such that the centrifugal fan assembly is operable to draw air from a lower region of an occupied space cooled by the hybrid fan and active heat pumping system into the air inlet and blow the air out of the air outlet; and
the active heat pumping system is operable to cool the air as the air is drawn into the air inlet of the centrifugal fan assembly from the lower region of the occupied space.

25. The hybrid fan and active heat pumping system of claim 24 wherein the active heat pumping system further comprises a hot side heat exchange assembly that is operable to reject heat of work and heat pumped by the heat pump to an upper area of the occupied space.

26. The hybrid fan and active heat pumping system of claim 24 wherein the occupied space is in a residential or commercial structure, and the active heat pumping system further comprises a hot side heat exchange assembly that is operable to reject heat of work and heat pumped by the heat pump to an unoccupied space of the residential or commercial structure.

27. The hybrid fan and active heat pumping system of claim 24 wherein the occupied space is in a residential or commercial structure, and the active heat pumping system further comprises a hot side heat exchange assembly that is operable to reject heat of work and heat pumped by the heat pump to an area external to the residential or commercial structure via an external reject assembly.

* * * * *